Feb. 28, 1933.　　　G. S. DAUPHINEE　　　1,899,017
APPARATUS FOR FILTERING AIR
Filed May 11, 1926　　2 Sheets-Sheet 1
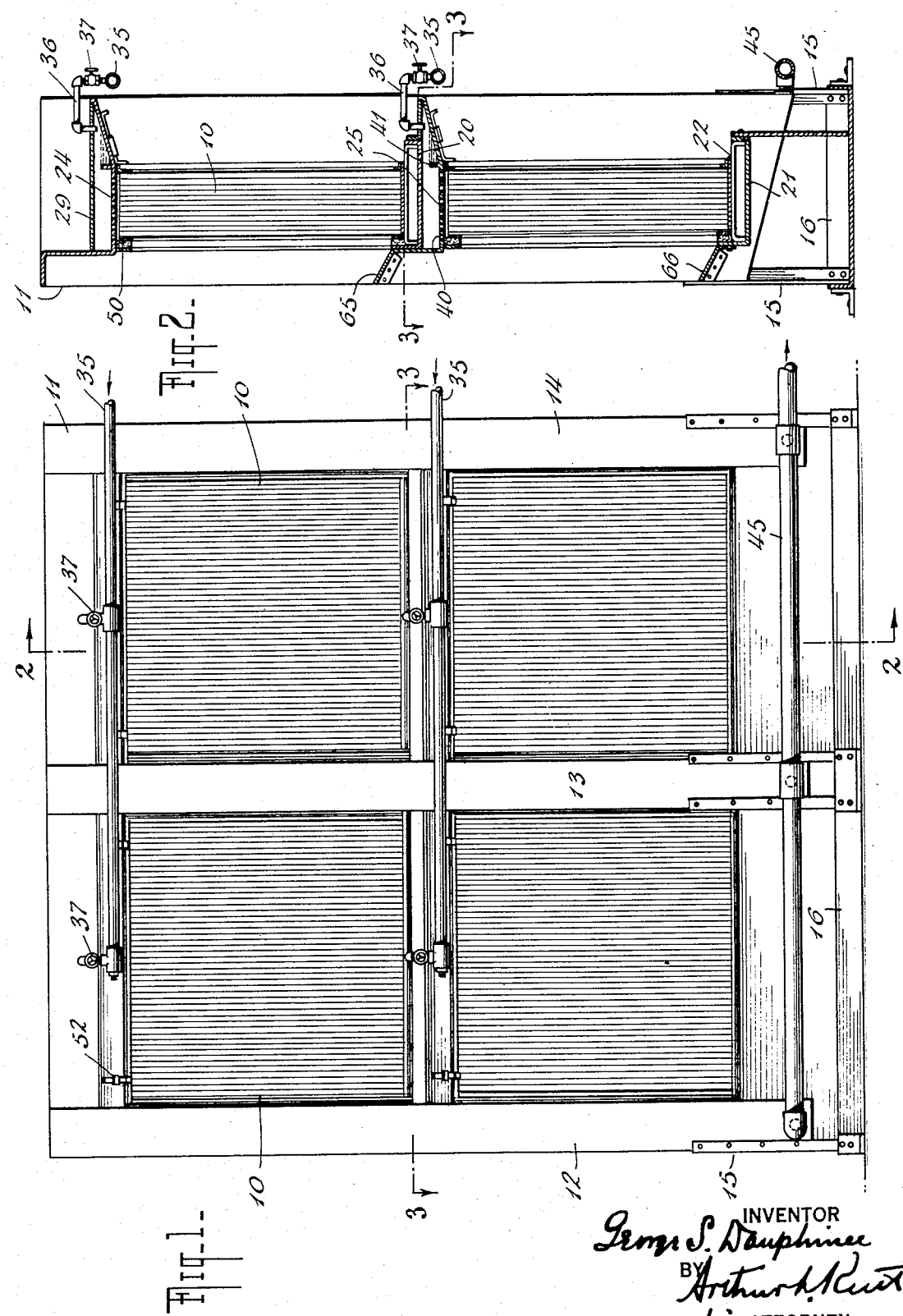

Feb. 28, 1933.   G. S. DAUPHINEE   1,899,017
APPARATUS FOR FILTERING AIR
Filed May 11, 1926   2 Sheets-Sheet 2
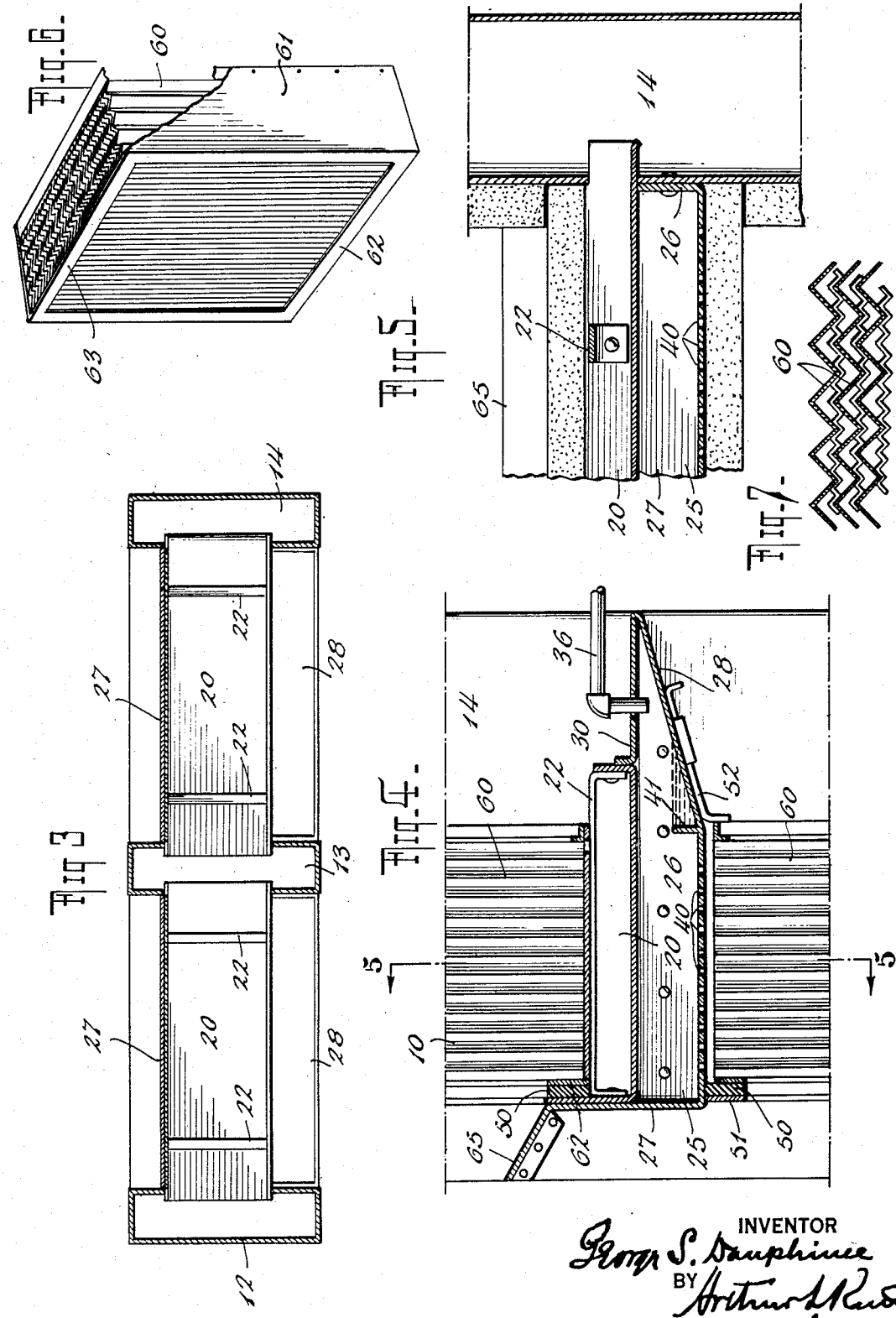
INVENTOR
George S. Dauphinee
BY
his ATTORNEY Patented Feb. 28, 1933

1,899,017

UNITED STATES PATENT OFFICE

GEORGE S. DAUPHINEE, OF BROOKLYN, NEW YORK, ASSIGNOR TO AMERICAN AIR FILTER CO. INC., OF LOUISVILLE, KENTUCKY, A CORPORATION OF DELAWARE

APPARATUS FOR FILTERING AIR

Application filed May 11, 1926. Serial No. 108,224.

This invention relates to air filters. The invention has to do with air filters of the kind known as viscous film filters in which the air is caused to flow through a space containing baffling surfaces which deflect and impede the flow of the air and which are covered with a film of viscous material to which the dust and other foreign matter carried by the air adheres.

Two types of viscous film air filters are in use. In one type the filtering units or cells are mounted in a supporting frame in which they remain stationary during use and from which they are removed for cleaning and recharging, which operation consists in washing the baffling surfaces of the unit with a washing liquid, such as hot water and washing soda, allowing the unit to drain and dry, and then immersing it in the viscous liquid, usually a heavy oil. This is a laborious and unpleasant operation and is usually not performed as frequently as it should be, and in order to lessen so far as possible the frequency of the operation, it is customary to use an oil or other liquid of relatively high viscosity which will adhere to the baffling surfaces in sufficient quantity to last over a relatively long interval between cleanings. Such more viscous oil, however, is less efficient in its filtering or dust catching operation than an oil or other liquid of lower viscosity which, however, would require too frequent cleaning and recharging of the filtering units.

In another type of such filters, the baffling surfaces are constructed in the form of a movable endless screen which is moved edgewise through the air flow passage and dips into a bath of viscous liquid. Filters of this type avoid the necessity of removing the filter units or cells for cleaning and recharging, but are relatively very expensive and bulky and necessitate the use of specially formed baffles or filtering media not of the most efficient character.

The object of the present invention is to avoid the disadvantages of the two types of air filters above referred to, and to make it possible to use stationarily mounted filtering units or cells which are maintained in proper operative condition without removal for the usual washing and recharging and without interruption of the filtering operation.

According to the present invention, the baffling surfaces of the air filter are cleaned and recharged by causing an excess of viscous liquid to flow downward on the baffling surfaces. The downwardly flowing liquid removes the old dirt-containing film from the baffling surfaces, and enough of the clean liquid remains on the surfaces to provide the desired dust-retaining film for continued operation of the filter. The oil or other viscous liquid used should be of relatively low viscosity. This is desirable for securing rapid and thorough cleaning of the surfaces, and is desirable also for leaving on the cleaned surfaces a film which is most efficient in its dust intercepting action. The fact that the film of oil of relatively low viscosity will be thinner, and therefore not active for so long a period as one of oil of higher viscosity, is not of importance since the cleaning and recharging operation is so readily performed and does not interrupt the operation of the filter.

Obviously, the cleaning and recharging of the baffling surfaces might be carried on continuously by providing for a continuous supply of oil to the top of the filter unit at a suitable low rate, and the effectiveness of efficiency of the filter would then be maintained constant. A more practical way of operating, however, is to supply the oil intermittently for cleaning and recharging at relatively short intervals, the oil control being either automatic or manual. When operating in this way the efficiency of the filter varies only within a comparatively narrow range and the filter is practically a constant effect filter. Only a relatively small amount of oil need be flowed over the baffling surfaces to maintain the filter, and as the dirt contained in the used oil may be readily removed therefrom and the oil re-used, the cost of maintaining the filter is very small.

The apparatus features of the invention include means providing baffling surfaces formed to serve as downwardly extending flow surfaces for the viscous liquid, and means for supplying the viscous liquid to the top of the filter unit and for receiving and discharging the liquid flowing from the bottom of the unit. An advantage of the invention from the structural side is that the filtering units need not be made of the small size heretofore used for convenience in removing the same for cleaning and recharging, but may be made of much larger size equal in air flow capacity to several of the small units or cells heretofore used. It is usually desirable, however, to make the unit removable from the supporting framework so that it may be taken out for repair purposes or for thorough cleaning at comparatively long intervals, and for large filters it is desirable to make up the total filtering capacity by a suitable number of such large size removable units. Features relating especially to the construction of such multiple unit air filters provided with means for cleaning and recharging the viscous film surfaces according to the present invention form a part of the invention.

In order that the invention may be clearly understood, it will be described in connection with the accompanying drawings, in which Fig. 1 is a front view of a multiple unit filter according to the invention;

Fig. 2 is a sectional view taken on line 2—2 of Fig. 1;

Fig. 3 is a horizontal sectional view taken on lines 3—3 of Figs. 1 and 2;

Fig. 4 is an enlarged sectional view of a part of the apparatus taken on line 2—2 of Fig. 1;

Fig. 5 is a partial sectional view taken on line 5—5 of Fig. 4;

Fig. 6 is a perspective view of one of the filter units removed from the filter frame and with a part of the edge wall or casing broken away.

Figure 7 is a horizontal sectional view showing a series of corrugated baffle or filter plates assembled together to provide a tortuous passage for the air flow.

Referring to the drawings, the filter shown comprises four filter units 10 mounted in a frame 11. The frame 11 is adapted to be set in the usual way in an air conduit or flow-way through which air to be filtered is caused to flow by any suitable means, the frame being set transversely of the flow-way so that the air has to pass through the filter units. The frame comprises three spaced vertical members 12, 13 and 14 which are hollow and rectangular in cross-section and are closed at the bottom, the closed bottom of each member slanting downwardly toward the front side of the frame. Each upright member is supported on legs 15 from a bottom plate which has upstanding edge flanges and serves as the drip pan 16. The uprights 12 and 14 are each connected with the central upright 13 by means of two drainage pans or troughs 20 and 21 constituting drainage means. The ends of the pans extend through openings in the sides of the upright members as shown by Figs. 3 and 5. The pans have front and rear flanges and each pan is provided with cross-bars 22 extending across the pan at a small distance above the bottom thereof to support a filtering unit. The pans 21 are positioned near the bottom of the frame to support the lower filter units, and the pans 20 are positioned near the middle of the height of the frame to support the upper units. Extending between the uprights 12 and 13 and 13 and 14, respectively, there are also two oil supply pans 24 and 25, constituting liquid supply means, the pans 25 being located just below the drainage pans 20 and the pans 24 being located at or near the top of the frame. Each of the pans 24 and 25 has end flanges 26 which are secured to the upright members 12, 13 and 14, respectively, and each has a rear flange 27. The bottom of each of these pans has an upwardly and forwardly slanting extension 28. The upwardly slanting portions 28 of the bottoms of the lower pans 25 extend forward beyond the front edge of the drainage pans 20. A cover plate 29 is provided for each of the pans 24, and each of the pans 25 has a cover plate 30 extending between the front edge of the drainage pan 20 and the edge of the part 28.

Oil or other viscous liquid for cleaning and recharging the filtering units is supplied from any suitable source through supply pipes 35 from which branch pipes 36 lead, one to each of the pans 24 and 25, each branch pipe being provided with a valve 37 and the discharge ends of the branch pipes extending through the cover plates 29 and 30 to discharge the oil on the inclined bottom portions 28. The main portion of the bottom of each of the pans 24 and 25 is set horizontally and has a multiplicity of distributed outlet openings 40 for discharging the oil distributed over the top of the filter unit mounted beneath the pan. For causing the oil supplied from the branch pipe 36 to be distributed lengthwise over the flat horizontal bottom of each of the pans 24 and 25, each pan is provided with an upwardly projecting ledge or dam 41 extending the whole length of the pan between the perforated horizontal portion of the bottom of the pan and the upwardly inclined forwardly extending portion thereof. This assemblage of elements constitutes means for distributing the liquid lengthwise of the perforate bottom of each pan. The drain pipe 45 is connected by branches to the bottom of each of the upright members.

The filter units 10 are of rectangular shape and of a thickness in the direction of air flow which may vary as desired but will usually be small compared to the height and breadth of the unit. Each unit is of a size to be set with an easy fit in one of the unit spaces of the frame, the bottom of the unit resting on the cross-bars 22 of one of the discharge pans 20 or 21 and the top of the unit extending close to the bottom of one of the supply pans 24 or 25. The edge portion of the rear side of the unit rests against a packing strip 50 held against a flange 51 which extends around the unit opening, and the unit is held in position by means of a latch 52 mounted to slide on the under side of the inclined bottom portion 28 of the supply tray.

Each filter unit is made with its baffling surfaces arranged to serve as downflow surfaces over which liquid supplied to the top of the unit will flow downward to be discharged from the bottom thereof, and the baffling surfaces are most desirably formed by assembling a plurality of longitudinally corrugated thin plates 60, usually of sheet iron, the plates being arranged to stand upright and being closely spaced so that the ridges on each side of each plate extend into the channels on the facing side of the adjacent plate. There is thus provided between the plates a plurality of air flow passages which are tortuous in the direction of the air flow, and by this arrangement also the baffling surfaces provide continuous flow surfaces for the oil supplied thereto at the top of the unit extending from the top to the bottom of the unit. The baffling plates may be secured together in any suitable manner and may be closed within a strap or casing 61 extending about the bottom and two vertical edge portions of the unit. If the casing is extended over the top of the unit also, this top wall of the casing will be of suitable open form so as to permit oil from the supply tray above the unit to fall onto the tops of the baffle plates, that is, the unit should have an open top. Most desirably, however, the top of the unit is left entirely open without any casing member extending across the top. A narrow flange 62 is desirably provided extending inward from the bottom and side portions of the casing 61 at the rear side of the unit, and a narrow strap 63 extends across the top of the rear side of the unit, this strap and the flange 62 serving as bearing members to rest against the packing strip 50 when the unit is set in the frame. Splash flanges 65 and 66 are desirably provided extending rearwardly from the bottom of each of the unit openings of the frame to catch any oil which may splash off from the unit, these flanges being set so that any oil thereon will drain back into the adjacent drainage pan 20 or 21.

In the use of the apparatus, when it is desired to clean and recharge any one of the filtering units all that is required to be done is to open the valve 37 of the branch supply pipe 36 leading to the supply pan 24 or 25 above the unit to be cleaned, the valve being opened only long enough to permit the necessary quantity, or charge, of oil to flow into the pan. The oil received from the supply pipe on the inclined forwardly extending portion 28 of the bottom of the pan flows over the dam 41 and thence over the whole length of the perforated bottom portion of the pan, and being supplied quicker than it can flow out through the perforations in the pan, spreads across the pan and escapes through all the perforations 40, being distributed over the top edges of the baffle plates of the filter unit. The oil thus supplied to the top of the baffle plates flows downward thereon and carries downward and into the drainage pan 20 or 21 beneath the unit, the dirt-infested oil of the oil film and leaves a new film of fresh oil distributed over the baffling surfaces. The dirty oil, consisting of the dirt infested oil of the old films on the baffling surfaces and the excess portion of the new oil which flows downward from the baffling surfaces into the pan 21, flows from the pan 21 into the upright frame members 12 and 13 or 13 and 14, and falling into the bottom of these members is drained away through the drain pipe 45, which may lead to any suitable settling and filtering means or other separating means for separating the dirt from the oil so that the oil may then be returned to the supply from which the supply pipes 35 are fed.

The amount of oil required at each cleaning and recharging operation is relatively small and the time required to apply it is comparatively short. Furthermore, by applying the flushing liquid to one portion after another or progressively, as by opening the several valves 37 at suitably spaced intervals of time, the air flow capacity of the filtering unit is only slightly reduced at any given time while oil is flowing along the baffling surfaces so that effective operation of the filter is not seriously interrupted. Where the filter comprises a plurality of separate units, this result is conveniently accomplished by cleaning and recharging said units serially or one at a time.

From the foregoing it will be apparent that the invention hereinabove described may be conveniently embodied in apparatus for filtering gases other than air. Accordingly the term "air filter" as used in the specification and claims is to be understood as including filters intended or adapted to be used for filtering gases other than air.

What is claimed is:

1. An air filter, comprising a supporting frame, and a filtering unit removably mounted in the frame, the unit having baffling surfaces arranged to provide tortuous air flow passages and to serve as downflow surfaces on which liquid supplied to the top of the unit will flow downward to be discharged from the bottom thereof, and the frame comprising spaced upright members one of which is hollow, a supply pan extending between the members above the unit having its bottom perforated to distribute liquid over the top of the unit, and a drainage pan extending between the uprights below the unit and extending through an opening in the wall of the hollow upright to discharge liquid into the hollow upright, and a drainage pipe leading from the hollow upright.

2. An air filter, comprising a supporting frame, and a plurality of filtering units removably mounted in the frame, each filtering unit having baffling surfaces arranged to provide tortuous air flow passages and to serve as downflow surfaces on which liquid supplied to the top of the unit will flow downward to be discharged from the bottom thereof, and the frame comprising spaced hollow upright members, a supply pan extending between adjacent upright members above each unit opening having its bottom perforated to distribute liquid over the top of the unit, and a drainage pan extending between adjacent upright members below each unit opening and extending through openings in the walls of the hollow upright members to discharge liquid into the upright members.

3. An air filter, comprising a filtering unit having baffling surfaces arranged to provide tortuous airflow passages and to serve as downflow surfaces on which liquid supplied to the top of the unit will flow downward to be discharged from the bottom thereof, a supply pan mounted above the unit, the bottom of the supply pan comprising a horizontal portion perforated to distribute liquid over the top of the unit and an upwardly slanting portion and having a ridge to serve as a dam to cause liquid supplied to the slanting portion to be distributed lengthwise of the horizontal portion of the bottom of the pan, and means for supplying liquid to the slanting portion of the bottom of the pan.

4. In an apparatus for filtering air, the combination of a unit filter having filtering material therein arranged to provide tortuous air passages and serve as down-flow surfaces over which liquid supplied to the top of the unit will flow downwardly to be discharged at the bottom thereof, liquid supply means extending across the top of the unit to distribute the liquid in a multiplicity of fine streams, drainage means mounted on said liquid supply means, unit supporting members attached to and at the top of the drainage means, said unit supporting means being spaced apart to allow liquid to adequately drain into the drainage means, means for removing the used liquid, a second unit filter mounted on said unit support members, and liquid supply means extending across the top of said second unit filter.

5. The combination with an air filter comprising a plurality of filtering units one above another and having filter plates arranged to provide tortuous air passages and serve as down-flow surfaces over which liquid supplied to the top of each unit will flow downwardly and be discharged at the bottom thereof; of a frame comprising spaced upright members one of which at least is hollow, liquid supply means extending across the top of each unit and attached to one of said hollow members to distribute the liquid to the filter plates in a multiplicity of fine streams, drainage means extending across the bottom of each unit and into the hollow upright member, said liquid supply means of a lower unit and the drainage means of an upper unit overlying said lower unit functioning additionally to space said units from each other.

6. The combination with an air filter comprising a plurality of filtering units one above another and having filter plates arranged to provide tortuous air passages and serve as down-flow surfaces over which liquid supplied to the top of each unit will flow downwardly and be discharged at the bottom thereof, of a supply pan extending across the top of each unit and provided with a perforated bottom to distribute the liquid to the filter plates in a multiplicity of fine streams, reservoir means in said supply pan, drainage means extending across the bottom of each unit to receive the used liquid and means for removing the liquid therefrom, said liquid supply means of each lower unit and the drainage means of an upper unit overlying said lower unit functioning additionally to space said units from each other.

7. The combination with an air filter comprising a plurality of filtering units one above another and having filter plates arranged to provide tortuous air passages and serve as down-flow surfaces over which liquid supplied to the top of each unit will flow downwardly and be discharged at the bottom thereof, of liquid supply means comprising a pan provided with a perforated bottom to distribute liquid lengthwise of the perforated bottom of said pan, drainage means extending across the bottom of each unit to receive the used liquid and means for removing liquid therefrom, said liquid supply means of each lower unit and the drainage means of an upper unit overlying said lower unit functioning additionally to space said units from each other.

8. In an apparatus for filtering air, the combination of a lower filter unit having baffling plates arranged to provide tortuous air passages and down-flow surfaces over which liquid supplied to the top of the unit will flow downwardly and be discharged at the bottom thereof, liquid supply means extending across the top of the lower unit to distribute the liquid in a multiplicity of fine streams, an upper filter unit overlying said lower unit, drainage means for the upper unit mounted over said liquid supply means of the lower unit, supporting members for said upper unit attached to and at the top of said drainage means, said unit supporting means being spaced apart to allow liquid to adequately drain from the upper unit into the drainage means, and means for removing the used liquid.

9. In an apparatus for filtering air, the combination of a lower filter unit having baffling plates arranged to provide tortuous air passages and serve as down-flow surfaces whereby liquid supplied to the top of the unit will flow downwardly to the bottom and be discharged therefrom, a supply pan having a perforated top extending across the top of said unit to distribute the liquid in a multiplicity of fine streams, means in said supply pan to distribute liquid lengthwise of the perforated bottom of said pan, a unit support mounted above said supply pan, an upper filter unit mounted on said filter support, a supply pan having a perforated bottom on said upper unit extending across the top thereof, means in said supply pan to distribute liquid lengthwise of the perforated bottom thereof, drainage means extending across the bottom of each unit to receive the used liquid, and means for removing the used liquid.

10. In an apparatus for filtering air, the combination of a lower filter unit having baffling plates arranged to provide tortuous air passages and serve as down-flow surfaces over which liquid supplied to the top of the unit will flow downwardly and be discharged at the bottom thereof, a supply pan having a perforated bottom extending across the top of the unit to distribute liquid in a multiplicity of fine streams, a ledge projecting from the bottom of the pan to distribute liquid lengthwise of the perforated bottom, a unit support mounted above said supply pan, an upper filter unit mounted on said support, a supply pan having a perforated bottom extending across the top of said upper unit, a ledge extending from the perforated bottom of said pan, drainage means extending across the bottom of each unit to receive used liquid, and means for removing the used liquid.

11. In an apparatus for filtering air, the combination of a filter unit having baffling plates arranged to provide tortuous air passages and serve as down-flow surfaces over which liquid supplied to the top of the unit will flow downwardly and be discharged at the bottom thereof, a filter supporting frame comprising spaced upright members, one of which at least is hollow, a liquid supply pan extending across the top of the unit and attached to one of said upright members by end flanges, said supply pan comprising a perforated bottom to distribute liquid to said baffle plates in a multiplicity of fine streams, an upwardly slanting member adjacent to the bottom of the pan, a projecting ledge extending the entire length of the pan and intermediate the bottom of the upwardly slanting member, drainage means mounted on said liquid supply means, unit filtering members attached to said drainage means, and a second filter unit mounted on said unit supporting members.

In testimony whereof, I have hereunto set my hand.

GEORGE S. DAUPHINEE.